United States Patent Office

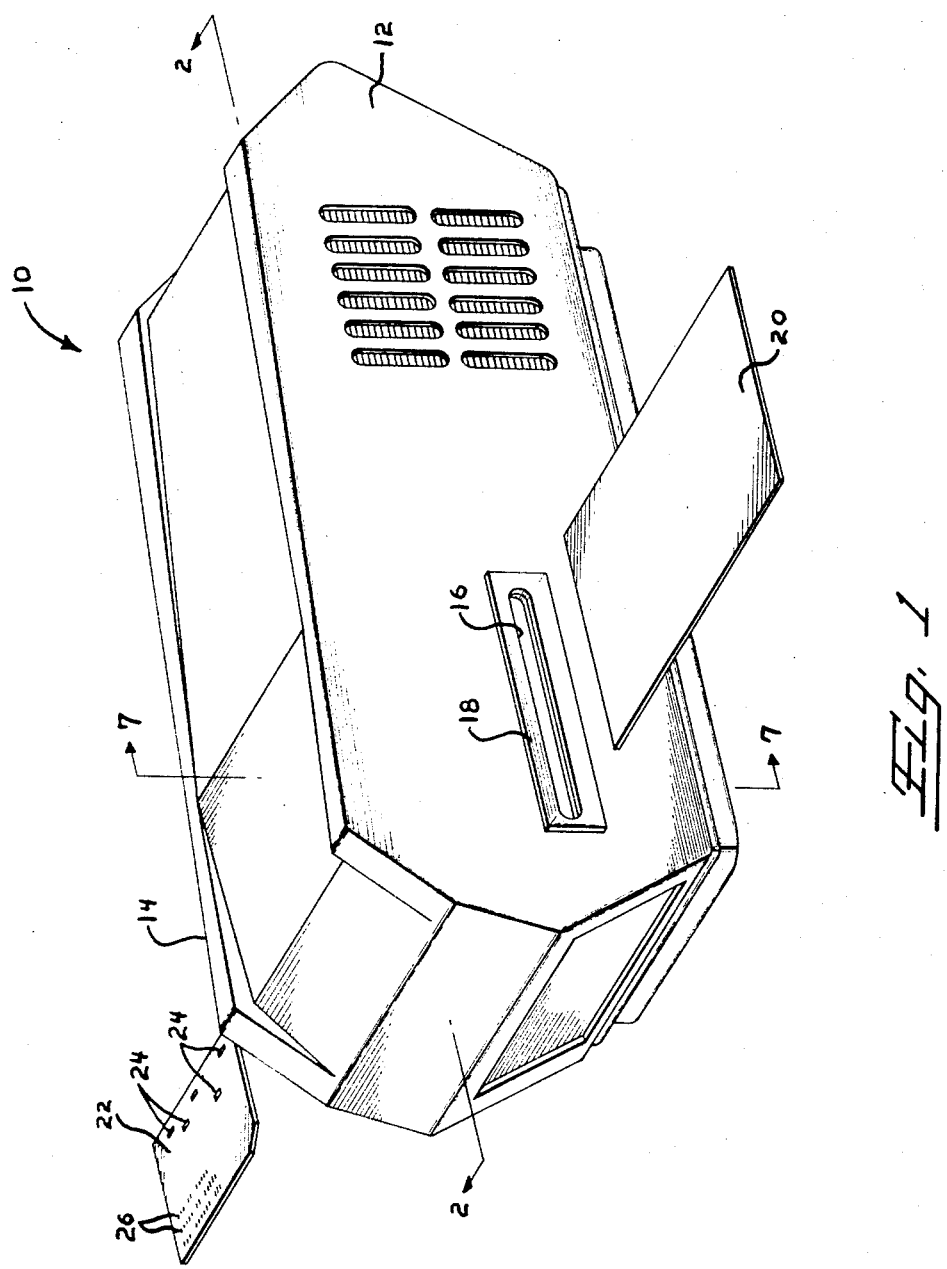

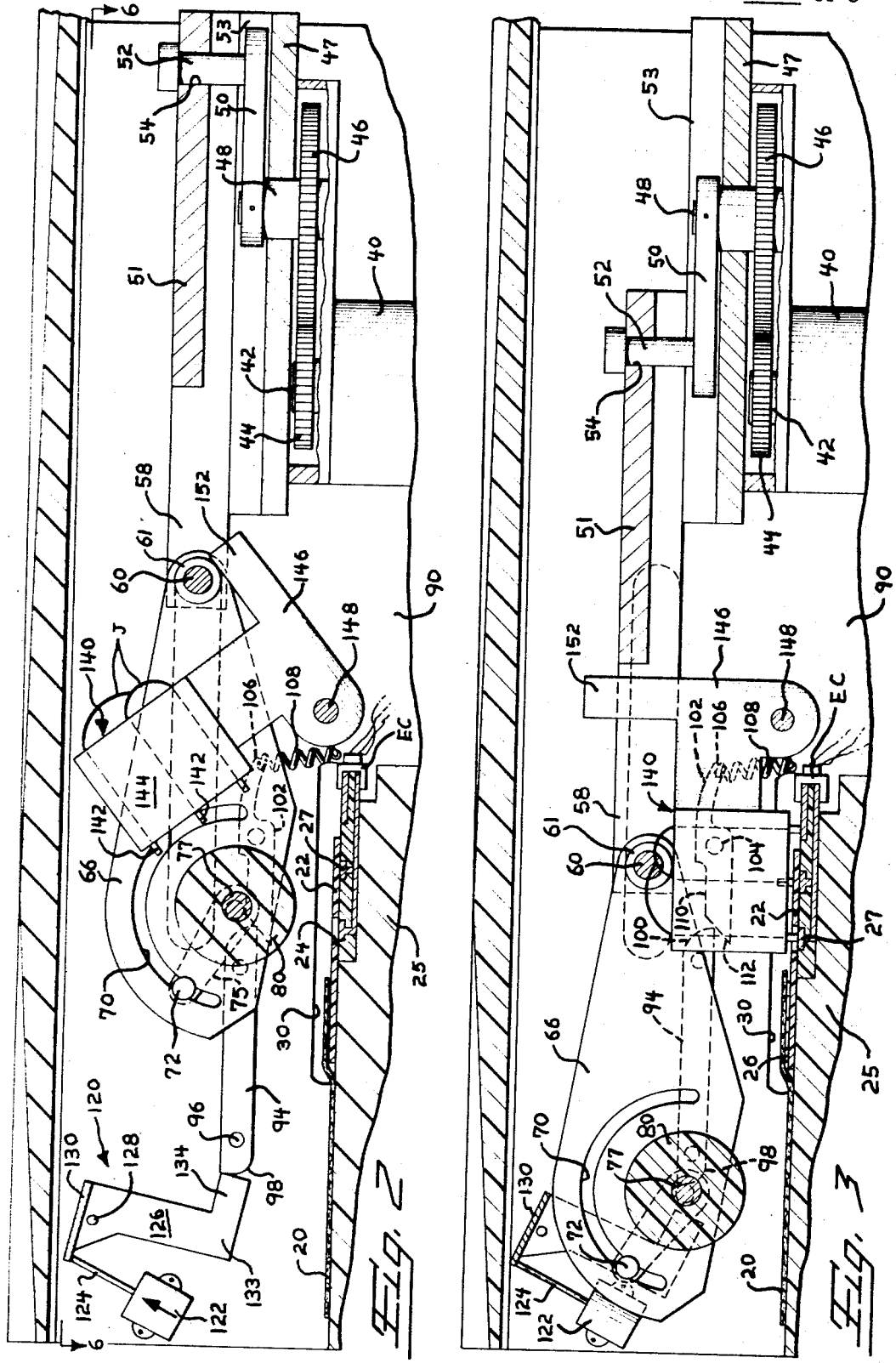

3,447,457
Patented June 3, 1969

3,447,457
CARD READER IMPRINTER AND/OR READER MECHANISM
Woodrow Wilson Dechert, Jr., Lebanon, and Richard Le Roy Zimmerman, Reading, Pa., assignors to AMP Incorporated, Harrisburg, Pa.
Filed Feb. 27, 1967, Ser. No. 618,787
Int. Cl. B41f 3/20, 3/04, 3/58
U.S. Cl. 101—269
10 Claims

ABSTRACT OF THE DISCLOSURE

An apparatus is disclosed which may be used to effect a credit transaction by first "reading" holes in a personal credit card to determine if credit should be extended and then either preventing the transaction by preventing a printing of a retail slip or completing a transaction by causing a retail slip to be imprinted by engagement of a roller with the retail slip and an identifying embossment on the credit card. The apparatus includes a housing having a motorized drive operable to drive a roller and reader head into engagement with the credit card and retail slip in a controlled sequence. The roller is supported between rails projecting inwardly of the housing and driven in an out stroke by a linkage in a first path of movement which causes the reader to read the credit card. The drive linkage is pivotally mounted so as to be relatively free in a vertical sense to rest on the rails. A mechanical switch is provided at the end of the rails which is operable to receive and support the roller and prevent printing or to open and permit the roller to travel in a second path biased by the rails down into engagement with the retail slip and an embossment on the credit card. An adjustment feature to control roller pressure is provided by an eccentric incorporated into the roller shaft.

---

This invention relates to a mechanism for imprinting symbols on a record form and for electrically reading information from a record form.

It is an object of the invention to provide apparatus for imprinting and/or reading records which include a simple and reliable mechanism for causing or preventing imprinting action.

It is a further object to provide an apparatus for imprinting and/or reading records which include a drive linkage and mounting arrangement of wide operating tolerance to assure a long operational life with minimum maintenance.

It is another object to provide a control mechanism for an imprinting roller which permits a variation in roller movement in at least two distinct paths by the operation of a single switch.

It is still another object to provide a simple and effective adjustment mechanism for imprinting rollers to vary printing pressure.

This case is related in overall function to U.S. application Ser. No. 545,391 filed Apr. 26, 1966, in the name of L. C. Friend.

In the drawings:

FIGURE 1 is a perspective view of the reader-imprinter of the invention showing a retail slip and a credit card positioned relative thereto and prior to insertion therein;

FIGURE 2 is a longitudinal section taken along lines 2—2 of FIGURE 1, showing the interior of the reader-imprinter of the invention with the mechanism thereof in an initial operating position;

FIGURE 3, is a longitudinal section similar to FIGURE 2, with the mechanism thereof operated to effect a reading of a credit card positioned therein and with the imprinting roller of such mechanism in a position of movement toward an imprinting position;

Figure 4:
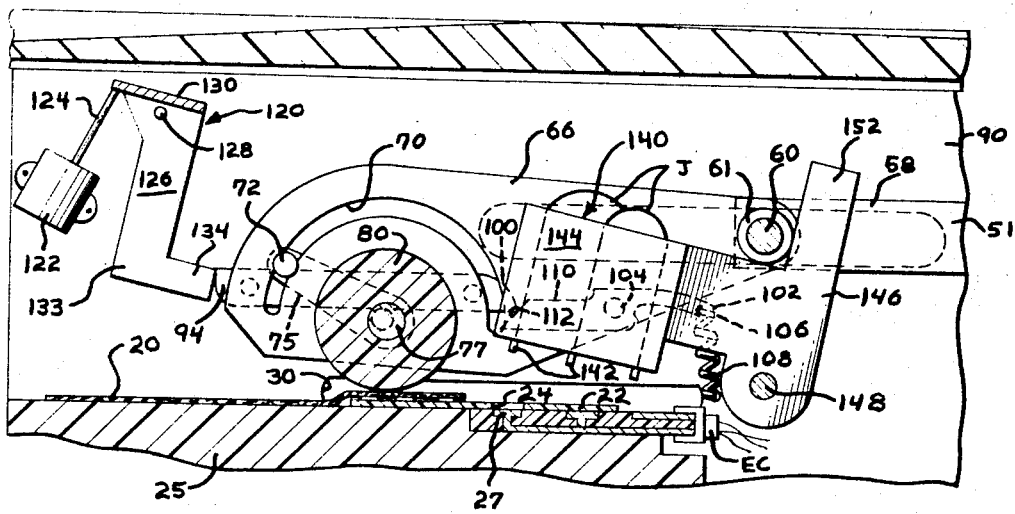
FIGURE 4 is a longitudinal section of a portion of the mechanism shown in FIGURE 2 with the reader thereof being withdrawn from a reading position and with the roller thereof in an imprinting position pressing a record against the embossment of a credit card.

In a representative embodiment of the invention the record form which is imprinted is a paper slip of the type used in retail stores to record sales information and the record which is read is a plastic credit card having holes therein in a pattern identifying the account of the holder of such card. In the representative embodiment taught herein the credit card also contains an embossed legend identifying in a discernible manner the name and address of the card holder and it is this legend which is caused to be printed upon the retail slip.

Component description

Turning now to FIGURE 1 the reader-imprinter of the invention is shown as 10. There is included an outer covering or housing of the configuration shown which is preferably of a light weight material such as plastic having opposing sidewalls 12 and 14. In each of the sidewalls there is a slot, such as the slot shown as 16 in the sidewall 12, of a configuration to receive a record inserted into the mechanism of the reader-imprinter. Surrounding each slot is a guide member such as 18 which serves to mark the position of the slot and to facilitate insertion of the record. A record 20 is shown positioned for insertion within the slot 16. This record may be considered as a retail slip of a standard type comprised of a plurality of paper sheets which must be filled out to record the name and address of a purchaser and the items and cost of items which are purchased in a commercial transaction. Generally opposite to slot 16 is a further slot in the sidewall 14 shown in FIGURE 6 as 30. Slot 30 serves to receive a further record such as a credit card 22 having an embossment 26 thereon containing the purchaser's name and address. The credit card also includes a series of apertures 24 which may be read by contact spring members forced against the card and through certain of the apertures to complete a selected pattern of electrical circuits.

Figure 6:
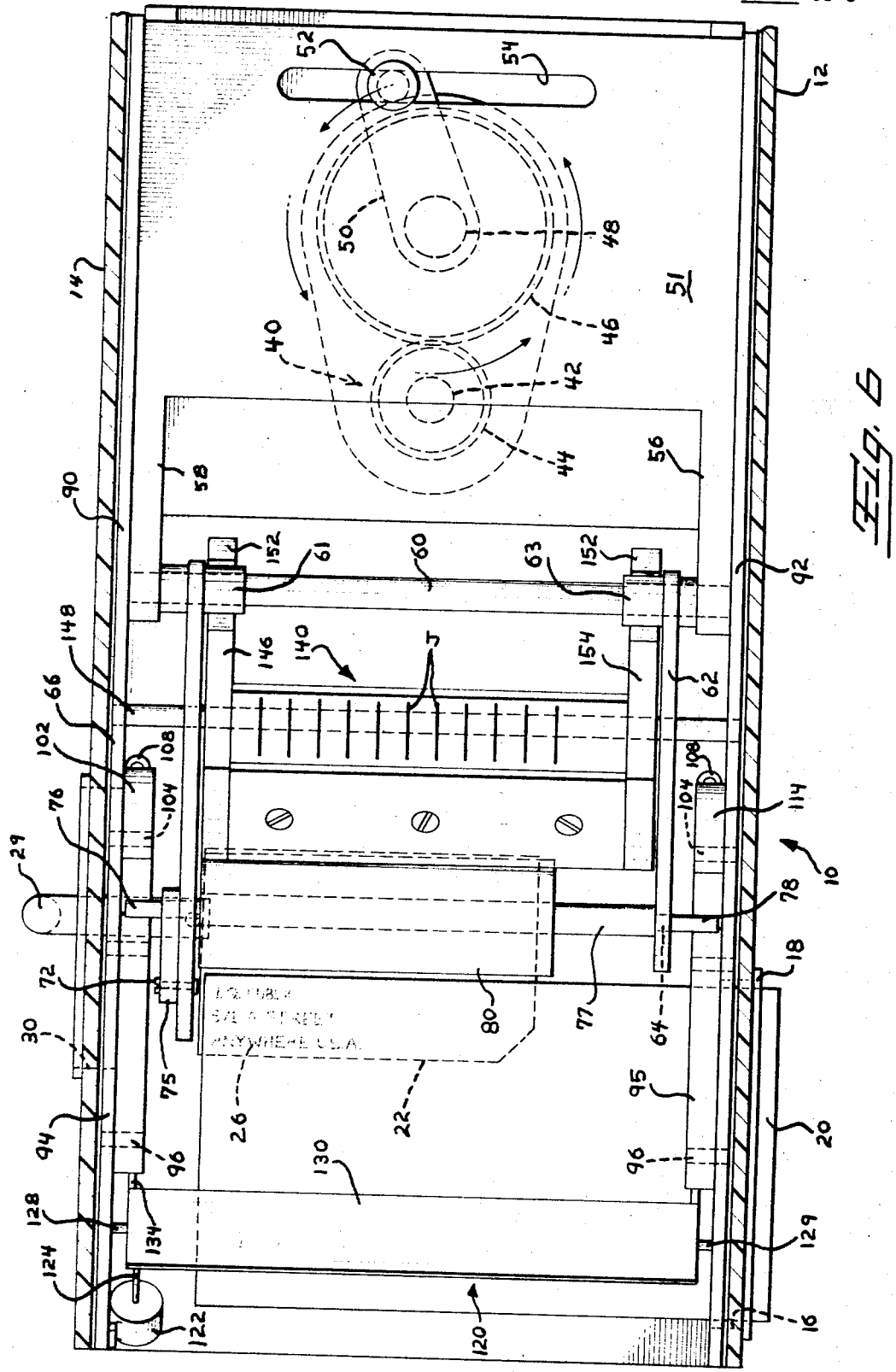
FIGURE 6 is a plan view in partial section showing the mechanism of the reader imprinter of FIGURE 2 in an initial position from the view that would appear from lines 6—6 shown in FIGURE 2.
Figure 7:
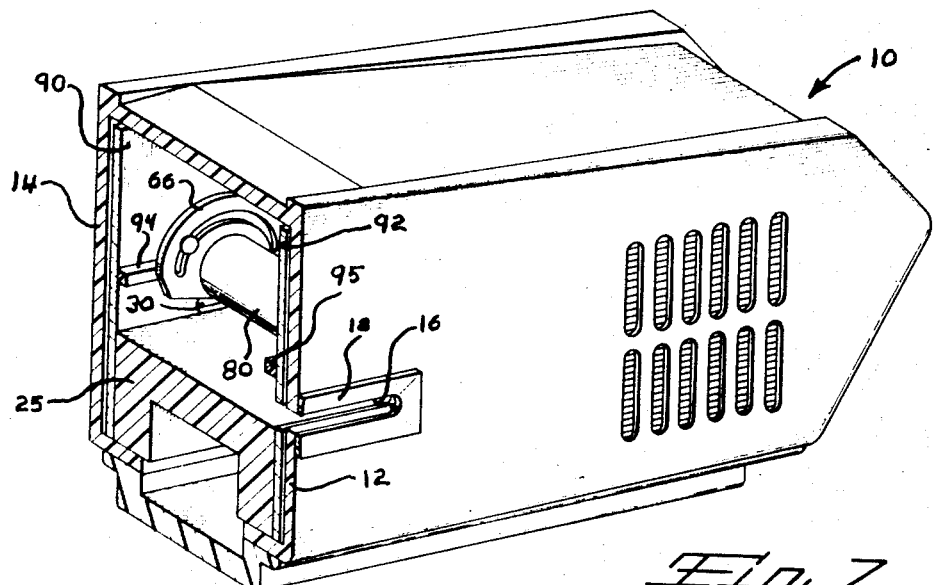
FIGURE 7 is a perspective view sectioned along lines 7—7 of FIGURE 1, included to show details of the housing and roller support rail of the mechanism of the invention.

Within the housing of 10 is a base member 25 shown in FIGURE 2 and FIGURE 7 as having an upper surface flush with slots 16 and 30 so as to receive, support and position records 20 and 22 upon insertion thereof. Means including a slidable handle shown only in part as 29 in FIGURE 6 may be provided to carry and position the record 22 within 10 in a proper position on the surface of 25. Other means, not shown, may be provided to guide one edge of the record 20 over a portion of the record 22 in the manner indicated in FIGURE 2. As can be seen from FIGURE 2, record 22 is positioned with the embossment facing up with a portion surface of a record 20 resting thereon. The apertured portion of the record 22 is not covered by 20. On the upper surface of 25 are conductive buses or bars shown as 27, which are aligned with the rows in which apertures 24 are placed in 22. These conductive bars permit a selective interconnection to be made between contact springs forced down against 27 through the apertures 24 in a manner to be described.

Referring now to the drive mechanism for 10 there is provided, as shown in FIGURE 6, a motor 40 connected to drive a shaft 42 in rotary movement. The shaft 42 is connected to a gear 44 which is positioned to mesh with a further and larger gear 46. The gear 46 is connected to a shaft 48 secured for rotary movement within a web 47 attached to the body of 10 and extending thereacross in the right hand region of the assembly as shown in FIGURE 2. Shaft 48 carries an arm 50 pinned thereto and at the end thereof a further shaft 52 captivated in a slot 54 of a movable drive plate 51 as shown in FIGURES 2 and 6. The slot 54 is made to extend for some distance across the rear of plate 51 transverse to the axis of plate movement. The drive plate 51 is supported for linear movement along an axis parallel to the sidewalls 12 and 14, by rails 53 which are integral with the cross web 47 secured to the sidewalls. Plate 51 includes to the left a pair of arms 56 and 58 extending out in the manner shown in FIGURE 6 and spaced apart to receive and support a shaft 60 secured at its ends to the arms. Movement of the plate 51 from left to right or right to left is thereby made to drive shaft 60 along the same axis of movement parallel to sidewalls 12 and 14.

Pivotally secured to shaft 60 are a pair of plates 62 and 66 which extend out from the ends of 56 and 58 in the manner depicted in FIGURES 2 and 6. The plates 62 and 66 each have an aperture such as 64 shown in FIGURE 6 to receive a shaft 77 which has end portions 76 and 78 extending through the plates and outboard thereof for purposes to be described. The shaft 77 includes mounted thereon a roller 80 which in a preferred embodiment is comprised of an ink filled plastic material. Rollers of this type are well known in the art and are usually referred to as self-inking rollers. The roller 80 is supported by shaft 77, but is free for rotary movement thereon.

Figure 8:
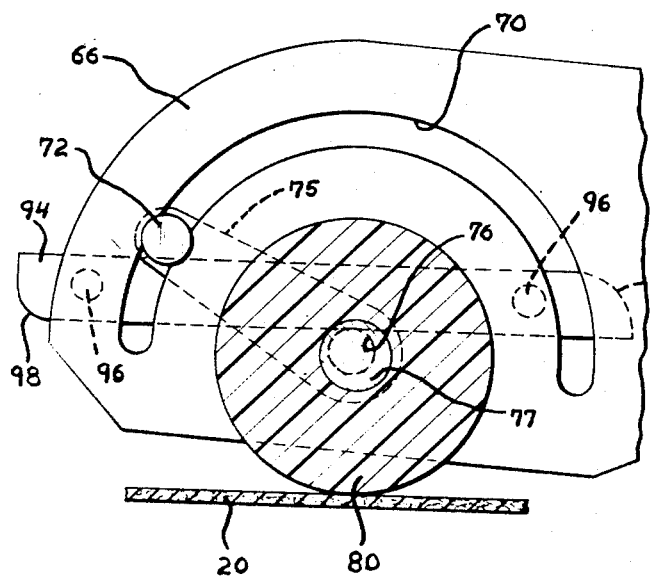
FIGURE 8 is a sectional view of the roller positioning eccentric of the invention mechanism.

As depicted in FIGURE 2 and in FIGURE 8, plate 66 is made to further include an arcuate slot 70 extending around 64 at a substantial radius therefrom. Extending through the slot 70 is a shaft 72 which includes means not shown to clamp an arm 75 in a given position relative to slot. This means may be any type of clamping fitting such as a threaded nut and bolt.

The end of 75 opposite 72 is tied to 77, as shown in FIGURE 8, so that as 72 is moved to different positions in slot 70 it will rotate 77. As can be seen, the end portions of the shaft shown as 76 and 78 in FIGURE 6 and as 76 in FIGURE 8 are off-center relative to shaft 77. As 77 is rotated end portions 76 and 78 are elevated or lowered with respect to the shaft center axis. As will be described hereinafter, the roller position is dependent upon the engagement of 76 and 78 with side rails 94 and 95 affixed to the side walls of the assembly. This means that the vertical position of the roller may be adjusted by adjusting the position of 72 and 75. This is of considerable advantage in initial assembly and in use to provide a simple but exact adjustment of print pressure.

Figure 5:
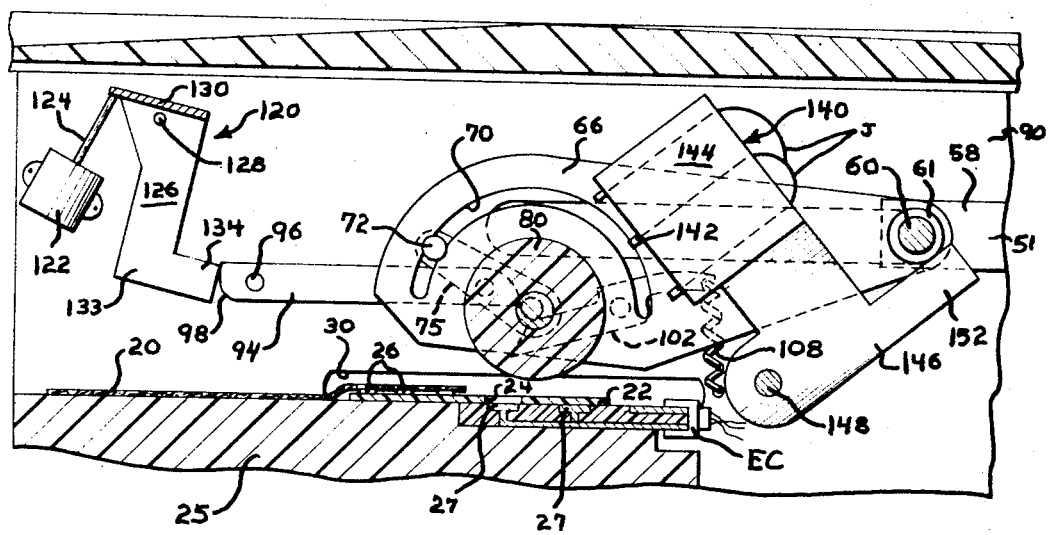
FIGURE 5 is a view of the mechanism of FIGURE 4 with the roller thereof in a position of movement back toward the initial position, as shown in FIGURE 2 passing through a restoring switch.

Within the outer covering of 10 including sidewalls 12 and 14 are further sidewalls shown as 90 and 92 which are preferably made of metal, such as a stamped sheet metal, to have substantial rigidity. Secured to each sidewall are members 102 and 114 member 102 being shown in FIGURES 2-6 and member 114 being shown in FIGURE 6. Both members are identical in structure and function and serve to support roller 80 in an initial position. Each member is attached to the inner sidewalls for pivotal movement via a bearing pin. Viewing 102 in FIGURE 3 the bearing pin is shown as 104 Each member includes at the right-hand end an extending portion such as 106 attached to a spring such as 108. The spring 108 is also secured to the inner sidewall 90 and is made to be under tension to hold the member 102 in the position shown in FIGURES 2-4 under a spring force. The spring 108 also serves to restore the member 102 to the position shown in FIGURES 2-4 from the position shown in FIGURE 5. The left-hand end 110 of 102 includes a face 112 shaped as indicated to effect a counterclockwise displacement of 102 when engaged by the end portion 76 of shaft 77 as it moves from left to right, as indicated in FIGURES 4 and 5. The face 112 is biased against the lower right-hand edge of a rail, shown as 94 in FIGURE 2, made to project inwardly from the sidewall 90. There is a similar rail 95 made to project inwardly from the sidewall 92 as shown in FIGURE 6 which cooperates with the member 114 in the same manner. The members 102 and 114 substantially alleviate tolerance problems which are found with fixed guide and lifting structures.

Viewing FIGURE 2, each of the rails 94 and 95 includes to the right a rounded end surface such as 100 shown relative to the rail 94 leading to a flat upper surface extending along the sidewall. At the lower left-hand edge of each rail is provided a further rounded surface such as 98 shown relative to 94. The rails are rigidly secured to the sidewalls 90 and 92. In the embodiment shown the rails are separate pieces made of a relatively hard slick plastic such as Delvin fastened to the sidewalls as by rivets such as 96. The rails may also be made integral with the sidewalls, if desired.

To the left of the rail members is an assembly shown as 120 in FIGURE 2, which includes a solenoid 122 having an arm 124 driven in the direction of the arrow upon energization. Solenoid 122 is fixed to sidewall 90, as shown. Arm 124 is made to engage a pivotable linkage 126 extending and supported between sidewalls 90 and 92 by pin members such as 128 and 129, shown in FIGURE 6. The member 126 includes a cross piece 130 which has a leftwardly projecting under surface engaged by the end of arm 124. At each end of 130 are downwardly projecting portions shown as 133 in FIGURE 2 which carry a further portion 134 projecting to the right to engage the ends of the rails 94 and 95. Operation of solenoid 122 causes member 126 to pivot on the pins 128 and 129 to withdraw the portion 134 to the position shown in FIGURE 3. Lack of operation of 122 leaves member 126 in the position shown in FIGURE 2 in direct engagement with the rails. As can be seen from FIGURE 2, the upper surface of 134 is approximately even with the top surface of the rail members. Means not shown may be employed to resiliently bias the member 126 to the position of FIGURE 2.

Figure 9:
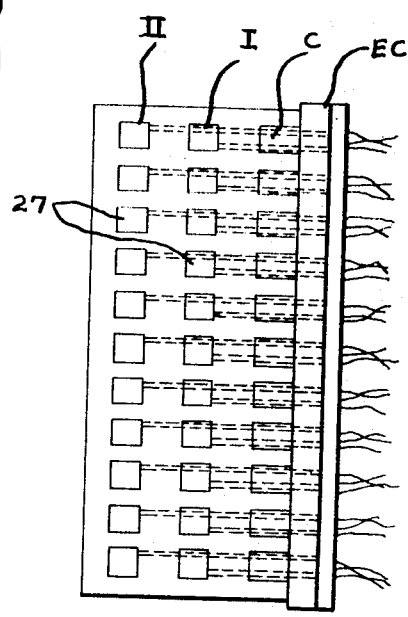
FIGURE 9 is a plan view of a circuit pattern for use with the reader of the invention.

Also secured for pivotable movement within the assembly 10 is a reader head 140 carried by a shaft 148 pivotable secured between the sidewalls 90 and 92, as shown in FIGURE 6. The reader head 140 includes a pair of side plates 146 and 154 having secured therebetween a contact spring carrying block 144; the ends of spring members 142 being shown in FIGURE 2 to project from the lower face of the block. A suitable reader head is taught in U.S. application Ser. No. 441,179 filed Mar. 19, 1965, in the name of W. W. Loose. Each side plate includes a projecting portion such as 152 shown in FIGURE 2 made to engage the shaft 60 through bushings shown as 61 and 63, mounted on the shaft. When the shaft 60 is in the position shown in FIGURE 2 it operates through the projecting portion 152 to hold the reader head 140 in the position shown. Suitable means which are not shown may be used to bias the reader head 140 counterclockwise relative to the shaft 60 with 152 against 61. Suitable leads not shown may be provided to either the buses 27 or to the reader head contacts. These leads may be employed to develop control signals in response to the contact springs contacting or not contacting the bus members in accordance with the pattern of apertures 24 in the record 22. As one example, the buses may be separate pads, one for each contact spring as shown in FIGURE 9, arranged in rows I and II with a common pad C as a third row. The pads in rows I and II may be connected by printed circuit paths to any standard edge connector EC which has a common input lead connected to C. The contact springs would then be jumped between the three rows, as indicated by J in FIGURE 2 and by the dotted lines in FIGURE 9 so that engagement by a contact spring through a record aperture will produce an output on the lead associated with the contact pad under such spring.

*Operation*

Assuming now that the retail slip 20 and the credit card have been inserted in the positions shown in FIGURES 2 and 6, the reader-imprinter 10 may be caused to cycle by energizing the motor 40 from any suitable means such as pushbutton switch connecting a supply to such motor. When motor 40 is energized it operates to rotate shaft 42 and the gear 44 to, in turn, rotate gear 46, shaft 48 and link 50. This drives shaft 52 in the slot 54 to in turn drive plate 51 to the left from the position shown in FIGURES 2 and 6. As plate 51 is driven to the left it drives shaft 60 to the left, imparting simultaneous drive movement to plates 62 and 66, to shaft 77 and roller 80. In the initial position shown in FIGURE 2, the ends 76 and 78 of the shaft 77, are in a position of rest on the top of members 110 and 114. Movement to the left will cause the shaft ends 76 and 78 to engage the rounded surface, such as 100, of the rails to raise the roller and therefore plates 62 and 66 slightly for movement to the left riding on the upper surfaces of the rails 94 and 95.

As the roller is driven to the left read head 140 is driven from the position shown in FIGURE 2 to the position shown in FIGURE 3 to engage the credit card and effect a reading thereof. This is accomplished by reason of the movement of the shaft 60 and the bushings 61 and 63 which engage the upper surface of plates such as 146 in the manner shown in FIGURE 4 to bias the reader head down against the card as shown in FIGURE 5. It will be observed from FIGURES 2-5 that a reading of the credit card will take place before the roller has reached the leftward position to either be maintained on top of the rails or to drop down to engage the record 20. In accordance with the invention this permits the credit card to be read with signals transmitted to some central computer memory to identify the respective purchaser and to check the credit of the respective purchaser. From this information a signal may then be transmitted to the solenoid 122 to permit an imprinting of the retail slip or to prevent an imprinting and the completion of a credit transaction and sale.

Assuming now that the credit card has been read and that the credit of the respective purchaser has been verified, energization of 122 permits the roller to drop down. The drive mechanism will at this time draw the roller back to the right with the ends 76 and 78 bearing against the under surface of the rails 94 and 95 to force the roller against the record 20 and effect a printing thereof by the embossment 26 on the credit card.

Shaft 60, in its travel to the right, engages the portions such as 152 as shown in FIGURE 2 and in FIGURE 4 to pivot the reader head out of the way of the roller and back to its initial position. The roller will continue until the ends 76 and 78 engage the surface 112 of the members such as 110. At this time members such as are driven to pivot in a counterclockwise sense to permit the roller to be drawn back up into the initial position resting on top of the members such as 110 which are biased back to the position shown in FIGURE 2 by springs such as 108. A reading and printing cycle will have then been accomplished.

If the signals generated during the read cycle had resulted in a lack of verification of credit so that solenoid 122 remained in the position of FIGURE 2, the roller would have been held up to prevent printing; the ends 76 and 78 of the shaft 77 riding out onto 134 and then back along the top of rails 94 and 95. The drive mechanism of the invention is accordingly made to have a left to right stroke limited to not override mechanism 120.

In summary, the invention mechanism operates in first and/or second paths of movement to either read the record 22 or read record 22 and imprint record 20. As an important point to reliability and to economy, the drive of the mechanism is independent from the means to determine path selection; i.e. the drive does not control path selection but merely follows through depending upon a mechanically unrelated switch (mechanism 120). This eliminates close tolerance as to left and right movement of the drive and the roller. Since the reader is also independently mounted and relatively free of the drive linkage it too does not require the kind of close tolerance that otherwise would be necessary with the incidental but important effect on reliability, frequency of adjustment and cost.

It should be apparent from the foregoing description that while the printing and reading features and the roller adjustment feature of the invention are all cooperatively related, each feature may have a separate use. It is contemplated that the roller drive may be used without a reader head or with a different type of reader head. It is also contemplated that the reader head may be used with other types of roller drives.

Having now disclosed the invention in terms intended to enable its preferred mode of practice, we define it through the appended claims.

We claim:

1. In an apparatus for printing a record, a housing including a platen secured therein and means to facilitate insertion of a record sheet and a printing means onto said platen, drive means and a linkage secured within said housing, said drive being connected to drive said linkage from an initial position near one edge of said platen along and over said platen and then back over said platen to said initial position, an imprinting roller pivotally connected to said linkage and driven thereby along said platen, said roller including extensions from each end, track means secured to said housing and positioned to support said roller by direct contact with said extensions under linkage drive for a first path of roller movement free of pressure contact with a record sheet and a printing means on said platen or in a second path of movement forcing said roller into pressure contact with a record sheet and a printing means on said platen to effect an imprinting of said record sheet, a movable member within said housing adjacent said track means and an input control means operable in one mode to position said movable member to abut said track means to prevent said roller from traversing said second path and to permit said roller to return over said first path of roller movement, and operable in another mode to position said movable member away from said track means to permit said roller to be driven by said drive down into a position to return in said second path of roller movement, as said linkage is driven to return to said initial position to thereby provide a selective imprinting or lack of imprinting through operation of said apparatus.

2. The apparatus of claim 1 wherein said track means is comprised of at least two rails spaced apart and said roller extensions are positioned to ride on said rails and to be supported on said rails as said roller is driven by said linkage in said first path of roller movement free of pressure contact with a record sheet and a printing means on said platen, or to ride beneah said rails, said rails being positioned within said housing to bias said roller into pressure contact with a record sheet and a printing means on said platen as said roller is driven by said linkage in said second path of roller movement.

3. The apparatus of claim 1 wherein said housing includes a pair of spaced-apart sidewalls and said track means is comprised of rail members projecting inwardly of said sidewalls and secured thereto with said rail members being positioned to support said roller extensions in said first path of movement with said roller free of pressure contact with the record sheet and a printing means on said platen and to bias said extensions and thereby bias said roller into pressure contact with a record sheet and a printing means on said platen in said second path of roller movement.

4. The apparatus of claim 1 wherein said movable member includes a surface to receive said roller extensions at the end of roller movement along said first path to hold said roller in a position barring its movement along said second path.

5. The apparatus of claim 1 wherein said movable member includes a movable element at each end of said track means, the element at one end of said track means being operable to contact said extensions and guide said roller from said first path of roller movement to said second path of roller movement and the element at the other end of said track means being operable to contact said extensions and guide said roller from said second path of roller movement into a position aligned with said first path.

6. The apparatus of claim 1 wherein means are provided to cause said drive means in driving said linkage means to push said linkage to effect the drive thereof from an initial position near one edge of said platen out over said platen and to pull said linkage to effect said linkage movement back to said initial position.

7. The apparatus of claim 1 wherein said track means has a configuration causing a linear movement of said linkage and said drive means to effect a linear movement of said roller in said first and second paths of roller movement.

8. The apparatus of claim 1 wherein said printing means includes a portion having intelligence thereon and said apparatus includes a reader head pivotally secured to said housing and positioned in the path of said linkage to be operated thereby during said linkage movement, the said reader head being biased against the further portion of said printing means to read said intelligence as said linkage is driven from said inital position out along said platen and driven out of contact with said further portion of said printing means as said linkage is driven back along said platen to said initial position, means responsive to the reading of said further portion serving to permit a control signal to operate said switch input control means to thereby control movement of said roller to traverse either said first path or said second path of roller movement.

9. The apparatus of claim 1 wherein said printing means includes a portion having intelligence thereon and there is provided a reader head secured within said housing to be driven into a position reading the intelligence on said further portion of said printing means by said linkage during movement of said linkage from said initial position out along said platen to effect a reading of said intelligence with said reader head being driven by said linkage during movement back to said initial position to restore said reader head to a nonreading position relative to said further portion of said printing means.

10. The apparatus of claim 1 wherein said drive means includes a driving arm and said housing includes means to confine said arm to movement parallel to said platen, said linkage being pivotally connected to said arm so as to provide the pivotal connection of said roller, the said linkage being free to follow said roller in a vertical sense relative to said platen and at the same time operating to drive said roller in movement parallel to said platen in order to reduce tolerances.

References Cited

UNITED STATES PATENTS

| 1,385,788 | 7/1921 | Kirshner | 101—306 |
| 2,994,265 | 8/1961 | Hurlbut et al. | 101—269 |
| 3,003,415 | 10/1961 | Herbert | 101—269 |
| 3,018,725 | 1/1962 | Maul et al. | 101—269 |
| 3,048,097 | 8/1962 | Miller | 101—306 X |
| 3,179,046 | 4/1965 | Maul et al. | 101—269 |
| 3,253,541 | 5/1966 | Goodrich | 101—269 |
| 3,272,120 | 9/1966 | Johnson | 101—56 |

WILLIAM B. PENN, *Primary Examiner.*

U.S. Cl. X.R.

101—285, 306